United States Patent
Machida (10) Patent No.: US 8,981,729 B2
(45) Date of Patent: Mar. 17, 2015

(54) CHARGING CONTROL APPARATUS AND CHARGING CONTROL METHOD FOR BATTERY

(75) Inventor: Kiyohito Machida, Aichi-ken (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 380 days.

(21) Appl. No.: 13/473,894

(22) Filed: May 17, 2012

(65) Prior Publication Data

US 2012/0299552 A1  Nov. 29, 2012

(30) Foreign Application Priority Data

May 24, 2011  (JP) .................................. 2011-116287

(51) Int. Cl.
| | |
|---|---|
| H02J 7/00 | (2006.01) |
| B60L 11/18 | (2006.01) |
| H02J 7/04 | (2006.01) |

(52) U.S. Cl.
CPC .............. B60L 11/1809 (2013.01); H02J 7/04 (2013.01); *Y02T 10/7088* (2013.01); *Y02T 10/7011* (2013.01); *Y02T 90/14* (2013.01)
USPC ........... 320/138; 320/104; 320/107; 320/108; 320/109; 320/110; 320/111

(58) Field of Classification Search
USPC .......................................... 320/103, 107–111
See application file for complete search history.

(56) References Cited

U.S. PATENT DOCUMENTS

| | | | |
|---|---|---|---|
| 8,204,638 B2 * | 6/2012 | Tani et al. ........................ | 701/22 |
| 8,531,159 B2 * | 9/2013 | Tominaga ..................... | 320/136 |
| 2004/0169489 A1 * | 9/2004 | Hobbs ............................ | 320/104 |
| 2010/0131137 A1 | 5/2010 | Iida | |
| 2011/0127958 A1 | 6/2011 | Ishishita et al. | |

FOREIGN PATENT DOCUMENTS

| | | |
|---|---|---|
| CN | 101682204 A | 3/2010 |
| JP | 06-153314 A | 5/1994 |
| JP | 4488426 B2 | 4/2010 |
| WO | 2010/005079 A1 | 1/2010 |

* cited by examiner

*Primary Examiner* — Nghia Doan
(74) *Attorney, Agent, or Firm* — Sughrue Mion, PLLC (57) ABSTRACT

A charging control apparatus for a battery includes a controller that controls charging of an in-vehicle lithium ion secondary battery that is charged by power based on regenerative braking performed during vehicle travel and charged by power from an external power supply; determines whether external charging, in which the battery is charged by the power from the external power supply, or the vehicle travel is underway; and when the external charging is determined to be underway, increases an upper limit value of a charging current relative to that of a case in which the vehicle travel is determined to be underway.

5 Claims, 6 Drawing Sheets

CHARGING CONTROL APPARATUS AND CHARGING CONTROL METHOD FOR BATTERY

INCORPORATION BY REFERENCE

The disclosure of Japanese Patent Application No. 2011-116287 filed on May 24, 2011, including the specification, drawings and abstract, is incorporated herein by reference in its entirety.

BACKGROUND OF THE INVENTION

1. Field of the Invention

The invention relates to a charging control apparatus and a charging control method for a battery.

2. Description of Related Art

In an electric vehicle, regenerative braking force is used to apply a brake to a drive wheel connected to a motor that is driven by a battery. At this time, power generated by the motor as a result of the regenerative braking is charged to a battery and thereby collected. When the battery is charged beyond a limit, however, the battery enters an overcharged state. To suppress such situations, a battery charging control apparatus that compares a battery voltage to a battery voltage limit and controls charging of the battery to ensure that the battery voltage does not exceed the battery voltage limit has been proposed (Japanese Patent Application Publication No. 6-153314 (JP 6-153314 A), for example).

A lithium ion secondary battery has a high energy density and both a higher initial open circuit voltage and a higher average operating voltage than other secondary batteries. A lithium ion secondary battery is therefore suitable for use in a power supply system for a hybrid automobile or the like that requires a large battery capacity and a high voltage. Further, a coulombic efficiency of a lithium ion secondary battery is close to 100%, and therefore the battery exhibits superior charging/discharging efficiency. Accordingly, the energy of a lithium ion secondary battery can be used more effectively than that of other secondary batteries.

However, depending on the manner in which the lithium ion secondary battery is used (for example, charging at a high rate, charging from a high state of charge (SOC), long-term continuous charging, or charging at a low temperature (charging in a state of high resistance)), lithium (Li) metal may be deposited on a negative electrode surface of the lithium ion secondary battery, and as a result, overheating or performance deterioration may occur in the lithium ion secondary battery.

It is therefore desirable to suppress lithium metal deposition in the negative electrode. Lithium metal deposition can be suppressed by greatly limiting a charging amount. In this case, however, it is impossible to collect a sufficient amount of the power generated by regenerative braking. Further, when the battery is charged by an external power supply, charging takes a long time.

SUMMARY OF THE INVENTION

A first aspect of the invention is a charging control apparatus for a battery, including a controller that controls charging of an in-vehicle lithium ion secondary battery that is charged by power based on regenerative braking performed during vehicle travel and charged by power from an external power supply; determines whether external charging, in which the battery is charged by the power from the external power supply, or the vehicle travel is underway; and when the external charging is determined to be underway, increases an upper limit value of a charging current relative to that of a case in which the vehicle travel is determined to be underway.

The charging control apparatus may further include: a battery current detection unit that detects a battery current; and a battery temperature detection unit that detects a battery temperature. Further, the controller may: estimate a state of charge of the battery; when the external charging is determined to be underway, calculate an allowable input current value at a larger value than that of a case in which the vehicle travel is determined to be underway, on the basis of the battery current, the battery temperature, and the estimated state of charge; and determine the upper limit value of the charging current on the basis of the allowable input current value.

The controller may calculate the allowable input current value $I_{lim}(t)$ per unit processing time dt using a following equation $$I_{lim}(t) = I_{lim}(t-1) - \alpha \times IB(t) \times dt - \beta \times \frac{I_{lim}(0) - I_{lim}(t-1)}{I_{lim}(0)} \times dt,$$

where $I_{lim}(0)$ is an initial allowable input current value used during initial charging, $I_{lim}(t-1)$ is a previously calculated allowable input current value calculated in a previous unit time, and $\alpha$, $\beta$ are coefficients. In this case, the controller may set the initial allowable input current value and the coefficients $\alpha$, $\beta$ so that the initial allowable input current value and the coefficients $\alpha$, $\beta$ in a case in which the vehicle travel is determined to be underway are different from the initial allowable input current value and the coefficients $\alpha$, $\beta$ in a case in which the external charging is determined to be underway.

The charging control apparatus may further include a first map and a second map used to calculate the allowable input current value. Further, the controller may switch between the first map and the second map according to whether the vehicle travel is determined to be underway or the external charging is determined to be underway.

The controller may determine whether or not the charging current is no greater than a predetermined value, and when the charging current is determined to be no greater than the predetermined value while the external charging is underway, the controller may increase the upper limit value of the charging current relative to that of a case in which the vehicle travel is determined to be underway.

A second aspect of the invention is a charging control method for a battery, including: controlling charging of an in-vehicle lithium ion secondary battery that is charged by power based on regenerative braking performed during vehicle travel and charged by power from an external power supply; determining whether external charging, in which the battery is charged by the power from the external power supply, or the vehicle travel is underway; and when the external charging is determined to be underway, increasing an upper limit value of a charging current relative to that of a case in which the vehicle travel is determined to be underway.

According to the configurations described above, charging can be performed more rapidly while suppressing Li metal deposition during charging from an external power supply.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the invention will be described below on the basis of the drawings.

Figure 1:
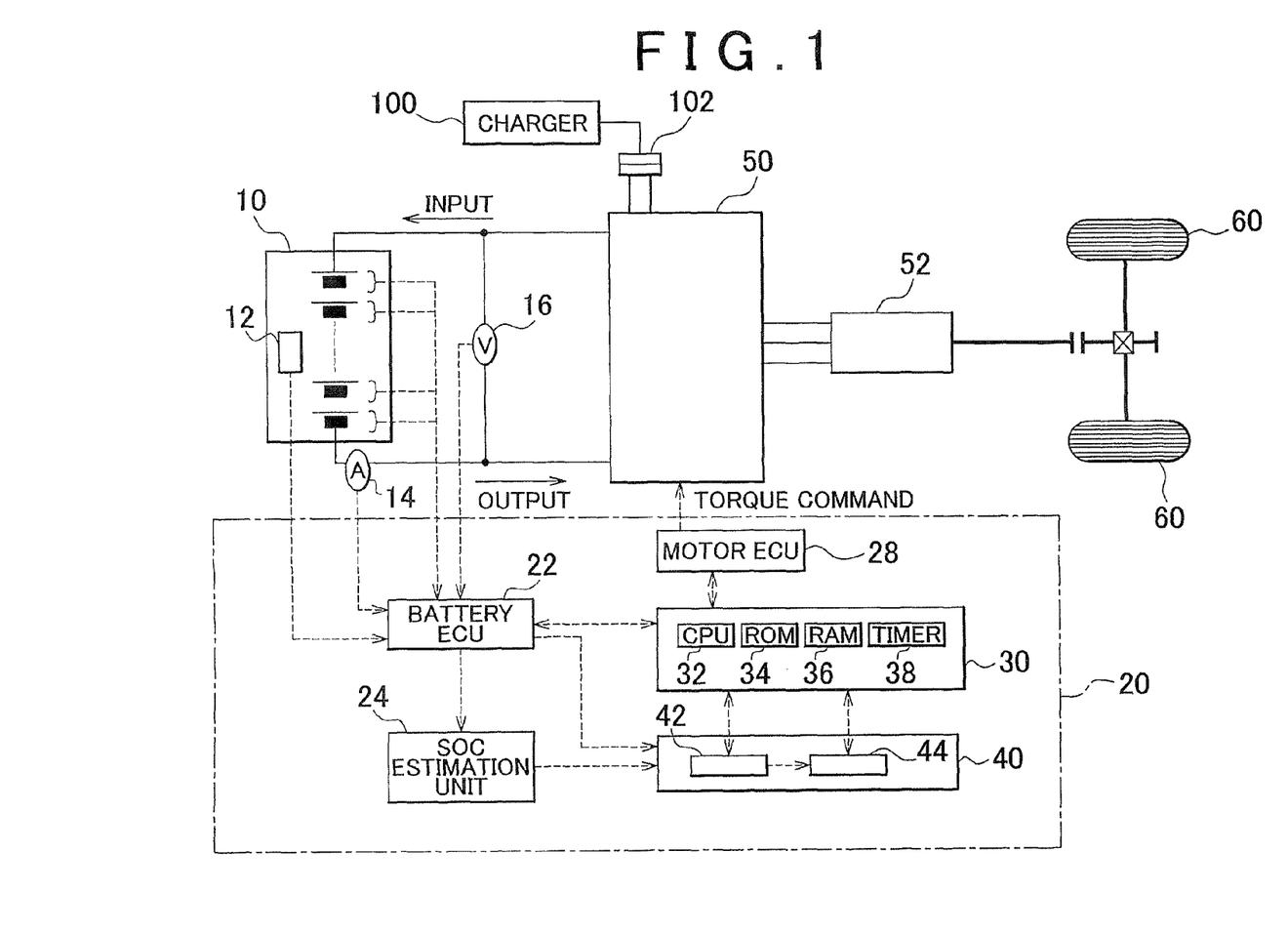
FIG. 1 is a schematic view showing a configuration of a hybrid automobile including a charging control apparatus for a battery according to an embodiment of the invention.

FIG. 1 shows an example of principal configurations of a vehicle (an electric automobile) that includes a charging control apparatus for a battery according to this embodiment. The battery according to this specification is a lithium ion secondary battery. Further, the "lithium ion secondary battery" according to this specification includes a lithium ion secondary battery that uses an electrolytic solution as an electrolyte and a lithium polymer battery that uses a polymer gel as the electrolyte. A charging/discharging control apparatus 20 including the charging control apparatus for a battery will be described below.

As shown in FIG. 1, the charging/discharging control apparatus 20 for a battery according to this embodiment includes a battery electronic control unit (ECU) 22 that monitors a condition of a battery 10, a SOC estimation unit 24 that estimates a state of charge (SOC) of the battery 10, a motor ECU 28 that drive-controls a motor 52, an electric vehicle electronic control unit (EVECU) 30 that performs overall control of a power output apparatus, and an allowable input power adjustment unit 40 that adjusts an allowable input power that can be input into the battery on the basis of a charging/discharging history during charging/discharging to ensure that a negative electrode potential of the battery, which is constituted by a lithium ion secondary battery, does not decrease to a lithium reference potential.

Figure 2:
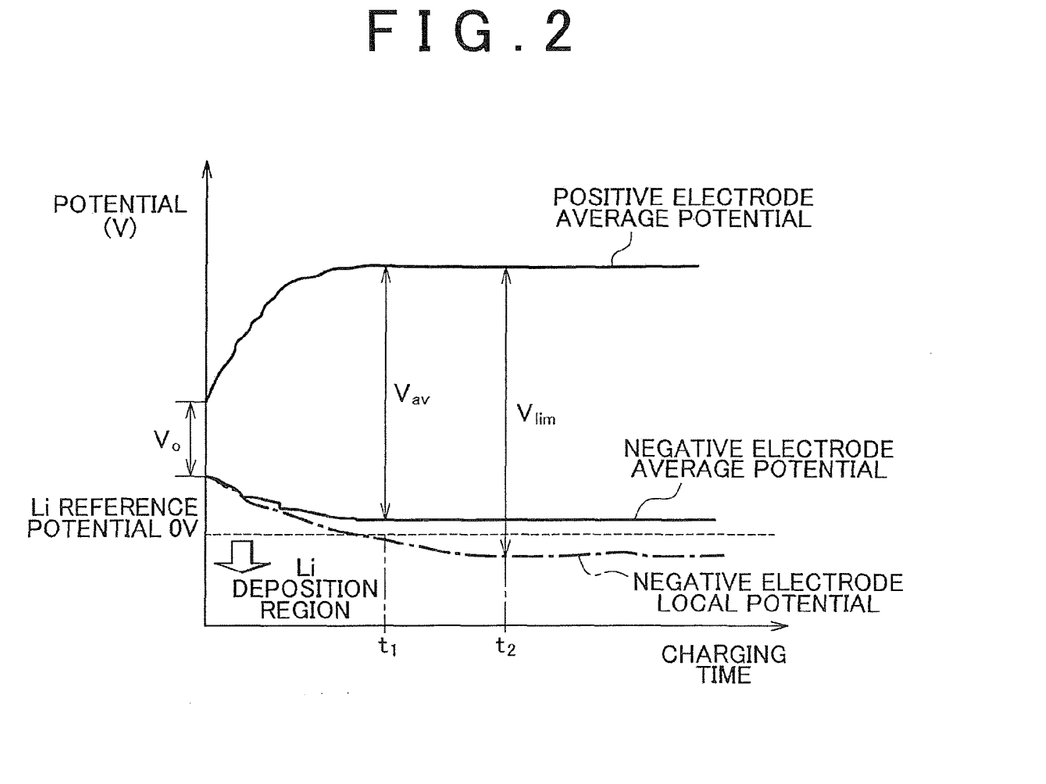
FIG. 2 is a view illustrating a charging time of a lithium ion secondary battery and transitions of a positive electrode potential and a negative electrode potential.

As shown in FIG. 2, when the lithium ion secondary battery used as the battery 10 is charged continuously, a positive electrode average potential increases while a negative electrode average potential decreases, and as a result, a potential difference ($V_{av}$) between positive and negative electrodes increases. When the negative electrode potential falls to or below an Li reference potential (0 V), Li metal is deposited onto a surface of the negative electrode. Therefore, when a lithium ion secondary battery is charged conventionally, Li metal deposition onto the surface of the negative electrode is suppressed by suppressing a terminal voltage between the positive and negative electrodes, i.e. a potential difference between the positive and negative average potentials, to within a predetermined potential (4.1 V, for example).

However, a reaction in a cell interior (positive and negative electrode surfaces) of the battery varies, and therefore, even when the potential difference ($V_{av}$) between the positive and negative electrode average potentials is within a predetermined voltage ($V_{lim}$), as indicated from a time t1 onward in FIG. 2, a negative electrode potential (to be referred to as a negative electrode local potential) in a partial site of the negative electrode may fall to or below the Li reference potential (0 V) such that Li metal is deposited onto the negative electrode surface in the corresponding site. Further, Li metal deposition is likely to occur through the process described above during charging at a high rate (20 C or more, for example), charging from a high SOC, long-term continuous charging, charging at a low temperature (in a state where an internal resistance of a battery cell is high), and so on.

Figure 3:
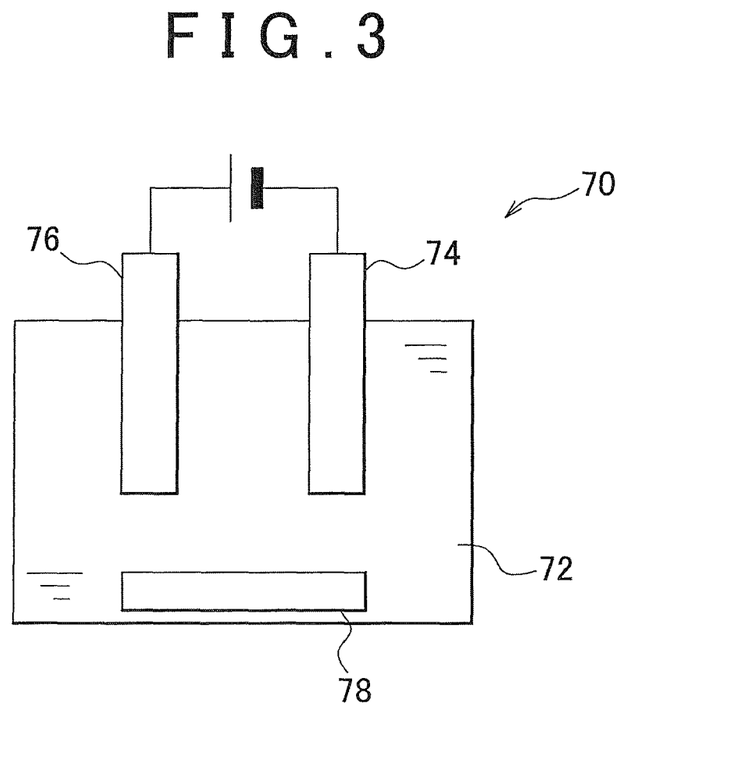
FIG. 3 is a schematic diagram showing an example of a configuration of the lithium ion secondary battery.

As shown in FIG. 3, a cell voltage is a potential difference between a positive electrode 74 and a negative electrode 76 of a cell of the lithium ion secondary battery. The negative electrode potential is a potential difference between the negative electrode 76 and an Li reference electrode 78 (potential 0 V). The positive electrode potential is a potential difference between the positive electrode 74 and the Li reference electrode 78 (potential 0 V). The negative electrode potential may be prevented from falling to or below the Li reference potential by reducing the positive electrode average potential, but in this case, it may be impossible to satisfy a required performance of the battery.

Hence, the charging/discharging control apparatus 20 for a battery according to this embodiment includes the allowable input power adjustment unit 40 for ensuring that the negative electrode potential does not reach the Li reference potential 0 V even locally.

FIG. 1 also shows a current sensor 14 that detects a battery current, a temperature sensor 12 provided in the battery 10 to detect a battery temperature, and a voltage sensor 16 that detects a battery voltage. As will be described below, to enable the allowable input power adjustment unit 40 to calculate a power value that can be input into the battery, detection values from the current sensor 14, the temperature sensor 12, and the voltage sensor 16 are input into the charging/discharging control apparatus 20 for a battery according to this embodiment.

The respective configurations described above will now be described in detail. Signals required to manage the battery 10, for example the battery voltage from the voltage sensor 16, which is disposed between output terminals of the battery 10, a charging/discharging current (also referred to hereafter as a "battery current") from the current sensor 14, which is attached to a power line connected to an output terminal of the battery 10, a battery temperature TB from the temperature sensor 12, which is attached to the battery 10, and so on are input into and stored in the battery ECU 22. Further, the SOC estimation unit 24 estimates the SOC (remaining capacity) by integrating a battery current value IB (t) that is input into the battery ECU 22 as an actual measurement value of the current sensor 14. Note that the battery current value IB (t) is preferably integrated using an estimated current value corrected in accordance with the actually measured battery temperature value TB (t). In so doing, the SOC can be estimated more accurately using other information such as a battery electromotive voltage.

The EVECU 30 is constituted by a microprocessor centering on a central processing unit (CPU) 32. The EVECU 30 includes, in addition to the CPU 32, a read-only memory (ROM) 34 that stores a processing program and the like and a random access memory (RAM) 36 that stores data temporarily, as well as an input/output port and a communication port not shown in the drawing. Information such as an accelerator depression amount, a brake depression amount, and a vehicle speed is input into the EVECU 30 on the basis of an ignition signal from an ignition switch, not shown in the drawing, a signal from an accelerator sensor, not shown in the drawing, and signals from other sensors. A torque command is determined in the EVECU 30 on the basis of the information such as the accelerator depression amount, brake depression amount, and vehicle speed, and the torque command is output from the EVECU 30 to the motor ECU 28. Driving of the motor 52 is then controlled in alignment with the torque command. Further, the EVECU 30 is connected to the motor ECU 28 and the battery ECU 22 via the communication port in order to exchange various control signals and data with the motor ECU 28 and the battery ECU 22. Furthermore, a program for calculating allowable input current values $I_{lim}$ (t), $I_{lim}'$ (t) and a battery input power limit value $W_{in}$ (t), which are calculated in the allowable input power adjustment unit 40 to be described below, is stored in the ROM 34. The RAM 36 temporarily stores a battery current value and a battery temperature value output from the battery ECU 22 and the allowable input current value $I_{lim}$ (t), an allowable input current value over time $I_{lim}'$ (t), and the battery input power limit value $W_{in}$ (t) calculated by the allowable input power adjustment unit 40, and also stores data required for various calculations.

The allowable input power adjustment unit 40 includes an allowable input current value calculation unit 42 and an input power limit value calculation unit 44. The allowable input power adjustment unit 40 adjusts the allowable input power that can be input into the battery 10 on the basis of the battery input power limit value $W_{in}$ (t), which is obtained every 100 msec, for example.

The allowable input current value calculation unit 42 determines an allowable input current value reduction amount F or f per unit time during charging or an allowable input current value recovery amount F' or f' per unit time during discharging and determines an allowable input current value recovery amount G or g per unit time through leaving the battery unused (over time) on the basis of a program stored in the ROM 34 of the EVECU 30 using the battery current value IB (t) at a time t, the battery temperature value TB (t) at the time t, and a charging capacity value SOC (t) at the time t. The allowable input current value calculation unit 42 then calculates the allowable input current value $I_{lim}$ (t) that can be input into the battery on the basis of the allowable input current value reduction amount F or f during charging or the allowable input current value recovery amount F' or f' during discharging and the allowable input current value recovery amount G or g through leaving the battery unused. Note that the battery current value IB (t) at the time t and the battery temperature value TB (t) at the time t are values output from the battery ECU 22 and stored temporarily in the RAM 36 of the EVECU 30. Further, the charging capacity value SOC (t) at the time t is a value estimated in the SOC estimation unit 24. The allowable input current value $I_{lim}$ (t) is calculated on the basis of a previously calculated allowable input current value $I_{lim}$ (t−1) calculated previously, but for a first time only, a set allowable input current value $I_{lim}$ (0) is used. The set allowable input current value $I_{lim}$ (0) is determined as a maximum current value at which Li metal deposition does not occur within the unit time when charging is performed from a state in which a charging/discharging history has no effect.

When charging is performed from an external direct current power supply (a charger), an appropriate allowable charging current is determined in accordance with the battery, and a value of the allowable charging current is set at a value having enough leeway to ensure that Li metal deposition does not occur even during continuous charging. Therefore, the set allowable input current value $I_{lim}$ (0) in a case where charging is performed from an external direct current power supply is set at this allowable charging current value, which is a smaller value than a maximum allowable input current value $I_{lim}$ (0) set on the assumption that charging is being performed using regenerative power.

In this embodiment, the allowable input current value calculation unit 42 calculates the allowable input current value $I_{lim}$ (t) using a following equation during charging. When no charging/discharging history exists, or in other words for the first time only, the allowable input current value $I_{lim}$ (t) is determined using Equation (1). More specifically, the allowable input current value $I_{lim}$ (t) is determined by subtracting the reduction amount F or the recovery amount F' during continuous charging/discharging and the recovery amount G through leaving the battery unused from the set allowable input current value $I_{lim}$ (0).

$$I_{lim}(T) = I_{lim}(0) - \int_0^T F(IB(t), TB(t), SOC(t)) dt - \int_0^T G(t, TB(t), SOC(t)) dt \quad (1)$$

where $I_{lim}$ (0) ≤ $I_{lim}$ (T) ≤ 0

In Equation (1), respective terms on the right side are as follows.

$I_{lim}$ (0): The maximum current value (the set allowable input current value) at which Li metal deposition does not occur within the unit time when charging is performed from a state in which the charging/discharging history has no effect.

$\int_0^T F(IB(t), TB(t), SOC(t)) dt$: An allowable input current value reduction term (in the case of discharging, an allowable input current value recovery term) when charging is performed continuously from a state in which no history exists to a time T.

$\int_0^T G(t, TB(t), SOC(t)) dt$: An allowable input current value recovery term through leaving the battery unused.

Further, when a charging/discharging history exists during charging, the allowable input current value $I_{lim}$ (t) is determined using Equation (2).

$$I_{lim}(t) = I_{lim}(t-1) - f(IB(t), TB(t), SOC(t)) \times dt - g(TB(t), SOC(t)) \times \frac{I_{lim}(0) - I_{lim}(t-1)}{I_{lim}(0)} \times dt \quad (2)$$

In Equations (1) and (2), $I_{lim}$ (T) and $I_{lim}$ (t) denote allowable input current values at the times T and t. IB (t) denotes the battery current value at the time t, TB (t) denotes the battery temperature value at the time t, SOC (t) denotes the battery SOC value at the time t, functions F, f denote allowable input current value reduction terms per unit time during charging, and functions G, g denote allowable input current value recovery terms per unit time through leaving the battery unused.

Figure 4:
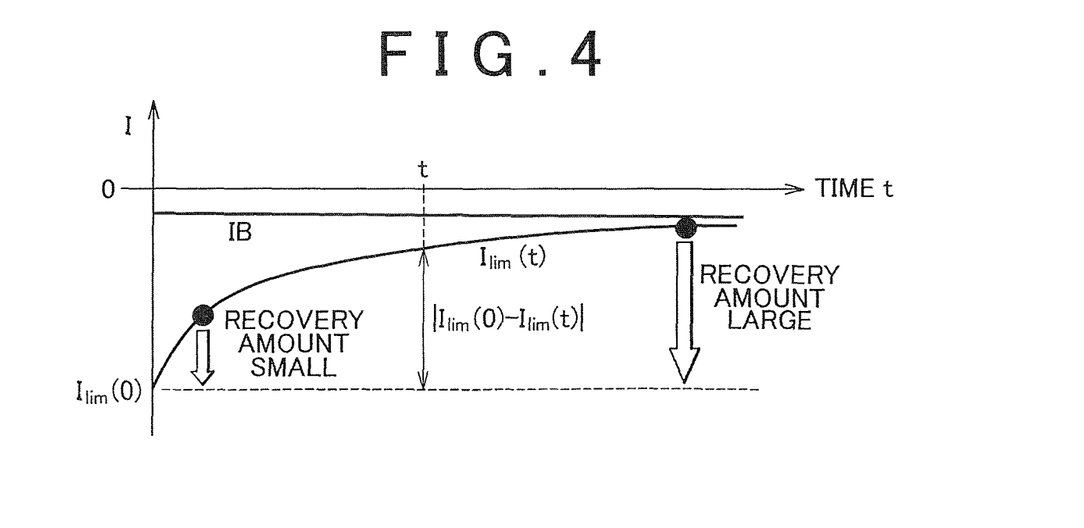
FIG. 4 is a view illustrating a current recovery amount obtained by leaving the secondary battery unattended while calculating an allowable input current value.

When $I_{lim}$ (t)=0, a negative electrode active material of the secondary battery is saturated with Li ions, and therefore $I_{lim}$ (0)−$I_{lim}$ (t) denotes an amount of Li ions in the negative electrode active material of the secondary battery. Meanwhile, the allowable input current value recovery amount through leaving the battery unused, shown in FIG. 4, is obtained when the amount of Li ions in the negative electrode active material decreases, and a magnitude thereof is commensurate with the amount of Li ions. Hence, the allowable input current value recovery amount through leaving the battery unused from $I_{lim}$ (t−1) at a time (t−1), that is earlier than the time (t) by the unit time (dt), is commensurate with a difference between $I_{lim}(0)$ and $I_{lim}(t-1)$. In Equation (2), this difference is divided by $I_{lim}[0]$ in order to make the difference dimensionless.

A coefficient α is determined by creating a three-dimensional map for a function f (x), having a temperature TB axis and a SOC axis, on the basis of actual measurement results, and f (x) is assumed as a primary expression of the battery current IB. Further, a coefficient β is determined by creating a three-dimensional map for a function g (x), having a temperature TB axis and a SOC axis, on the basis of actual measurement results. Furthermore, $I_{lim}(0)$ is determined by creating a map relating to TB (t) and SOC (t) on the basis of measurement results.

From the above, Equation (2) can be expressed as shown in Equation (3).

$$I_{lim}(t) = I_{lim}(t-1) - \alpha \times IB(t) \times dt - \beta \times \frac{I_{lim}(0) - I_{lim}(t-1)}{I_{lim}(0)} \times dt \quad (3)$$

Note that a speed of Li⁺ moving through the negative electrode active material has an upper limit. Therefore, in Equation (3), a limit is preferably applied to the third term on the right side, by which β is multiplied, to ensure that the value of $I_{lim}(t-1)$ does not reach or exceed a predetermined upper limit value.

In the case of discharging, respective signs of the function F and the function f in Equations (1) and (2) are switched from minus to plus, whereby following equations are obtained.

$$I_{lim}(T) = I_{lim}(0) + \int_0^T F(IB(t), TB(t), SOC(t))dt - \int_0^T G(t, TB(t), SOC(t))dt \quad (4)$$

where $I_{lim}(0) \leq I_{lim}(T) \leq 0$ $$I_{lim}(t) = I_{lim}(t-1) + f(IB(t), TB(t), SOC(t)) \times dt - g(TB(t), SOC(t)) \times \frac{I_{lim}(0) - I_{lim}(t-1)}{I_{lim}(0)} \times dt \quad (5)$$

Equations (4) and (5) are similar to Equations (1) and (2) apart from the fact that the functions F, f denote the allowable input current value recovery term during discharging per unit time, and therefore description of Equations (4) and (5) has been omitted.

In an electric automobile or a hybrid vehicle, charging may be possible using power from an external power supply. When charging (to be referred to hereafter as rapid charging) is performed from an external power supply, a required charging time is preferably as short as possible. In the case of an electric automobile, for example, charging may be performed at a charging station or the like, and rapid charging is particularly desirable in this case.

The allowable input current value $I_{lim}(t)$ is calculated by determining the coefficients α, β and the set allowable input current value $I_{lim}(0)$ such that Li metal deposition does not occur even under a large current generated by regenerative braking during travel.

However, a charging current from the external power supply during rapid charging is determined in advance, and there is therefore no need to receive a large current such as that generated during regenerative braking.

Figure 6:
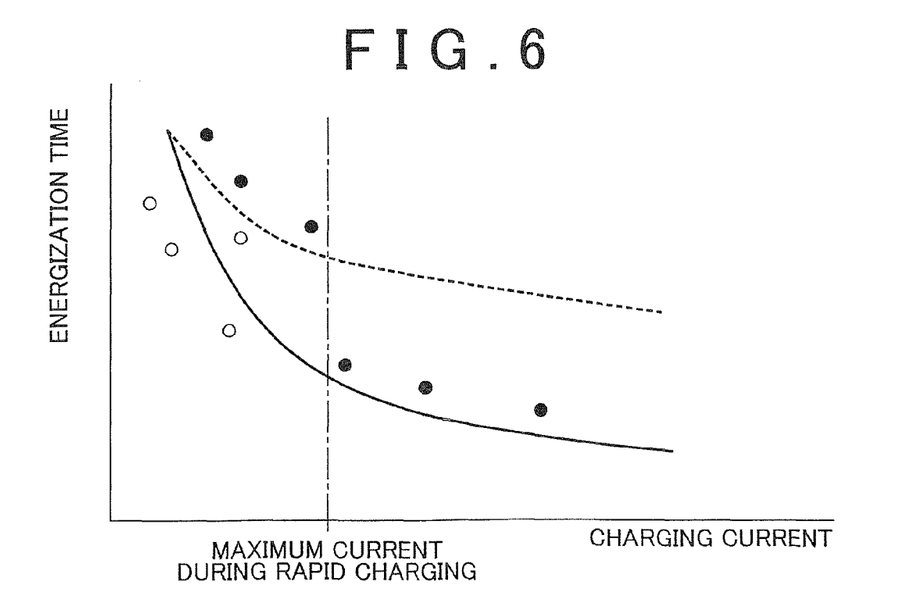
FIG. 6 is a view showing a characteristic of Li metal deposition corresponding to a charging current.

FIG. 6 shows results of an experiment performed to determine whether or not Li metal deposition occurs in accordance with the charging current and a duration thereof. In FIG. 6, an abscissa shows the charging current and an ordinate shows an energization time. Further, black circles in the drawing indicate that Li metal deposition has occurred, while white circles indicate that Li metal deposition has not occurred. According to these experiment results, Li metal deposition occurs as the charging current increases, even when the duration is short. The allowable input current value $I_{lim}(t)$ in a case where the coefficients α, β and the set allowable input current value $I_{lim}(0)$ are determined on the basis of these results, also taking into consideration the large charging current corresponding to a regenerative current, is indicated in the drawing by a solid line.

Meanwhile, the allowable input current value $I_{lim}(t)$ for rapid charging in a case where the coefficients α, β and the set allowable input current value $I_{lim}(0)$ are determined on the basis of experiment results in a case where the charging current is smaller than a maximum current value during charging from an external power supply is indicated in the drawing by a broken line. It has been confirmed experientially that by setting a maximum current value for rapid charging from an external power supply in this manner, Li metal deposition does not occur even when an allowable input current value by which limitations on the charging current are alleviated (the allowable input current value $I_{lim}(t)$ for rapid charging indicated by the broken line in the drawing) is applied during rapid charging from an external power supply.

Hence, in this embodiment, the allowable input current value $I_{lim}(t)$ during rapid charging is changed from the allowable input current value $I_{lim}(t)$ during travel. In so doing, rapid charging can be performed with the allowable input current value $I_{lim}(t)$ for rapid charging set at a larger value than the allowable input current value $I_{lim}(t)$ for travel, while suppressing Li metal deposition.

Further, the allowable input current value $I_{lim}(t)$ is changed by switching the map storing the coefficients α, β and the set allowable input current value $I_{lim}(0)$, and therefore charging control can be performed easily and reliably simply by modifying the coefficients rather than modifying the charging control method itself.

Figure 7:
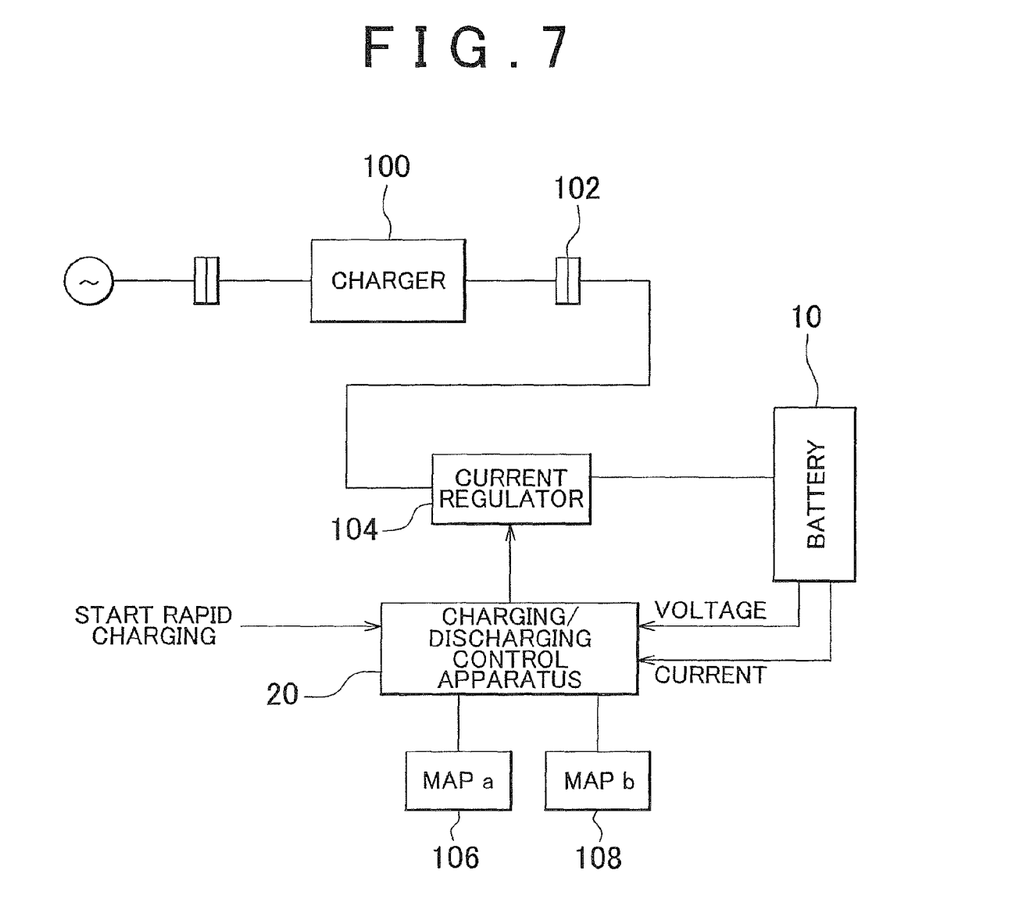
FIG. 7 is a view showing a configuration for limiting a current during rapid charging.

FIG. 7 shows an outline of the configuration of a rapid charging system. A charger 100 that receives a power supply from a 200 V commercial alternating current power supply or the like converts alternating current power into direct current power and outputs the direct current power. The charger 100 is capable of constant current output and constant voltage output. In a normal case, charging is performed through constant current output and terminated when the SOC reaches a predetermined upper limit value (approximately 70%, for example). In this embodiment, however, the vehicle includes a current regulator 104, and therefore the charging current is controlled on the vehicle side. Hence, the charger 100 may output a constant voltage.

The charger 100 is connected to a connector 102 provided on the vehicle. The charging current is supplied to the battery 10 installed in the vehicle via the connector 102.

The current regulator 104 is provided on a path extending from the connector 102 to the battery 10. The current regulator 104 regulates the charging current. The current regulator 104 is controlled by the charging/discharging control apparatus 20 to ensure that the charging current does not exceed the allowable input current value $I_{lim}(t)$.

The current regulator 104 controls the charging current in response to a control signal from the charging/discharging control apparatus 20. The current regulator 104 is a circuit that receives the charging current from the charger 100 and controls the charging current of the battery 10. A converter of a converter/inverter 50 is used as the current regulator 104. A current limit is preferably provided by controlling the converter to ensure that that the charging current of the battery 10 does not exceed the allowable input current value $I_{lim}$ (t) for rapid charging. Note that a specialized current regulator for rapid charging may be provided, and the charging current may be controlled using the EVECU 30.

Hence, during travel, the charging/discharging control apparatus 20 controls the converter/inverter 50 on the basis of the coefficients α, β and the set allowable input current value $I_{lim}$ (0) for travel, which are stored on a first map 106, whereas during rapid charging, the charging/discharging control apparatus 20 controls the current regulator 104 on the basis of the coefficients α, β and the set allowable input current value $I_{lim}$ (0) for rapid charging, which are stored on a second map 108.

Figure 8:
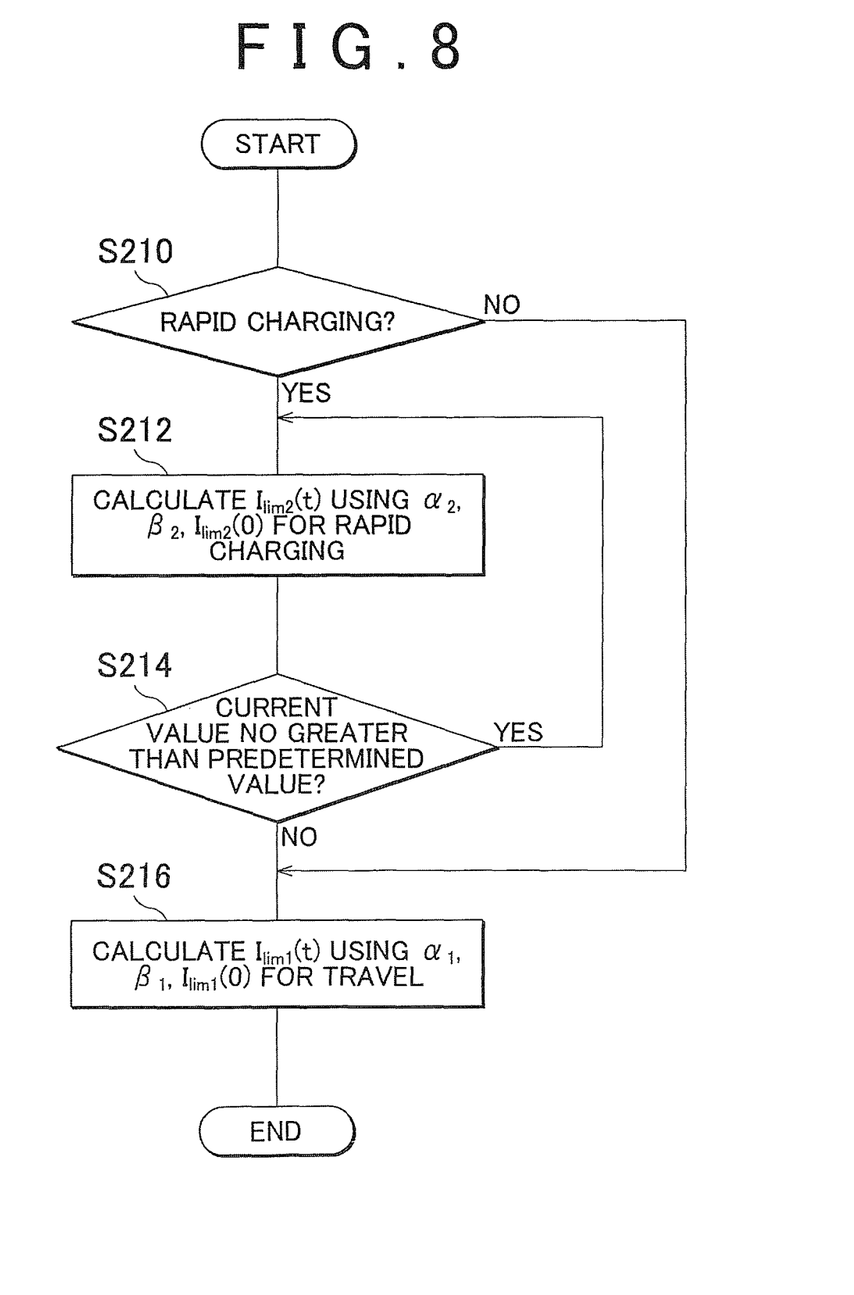
FIG. 8 is a flowchart for calculating an allowable input current during rapid charging.

FIG. 8 is a flowchart showing map switching processing. First, a determination is made as to whether or not rapid charging is underway (S210). The determination as to whether or not rapid charging is underway is made by detecting that the external charger 100 is connected and power is being supplied, and determining whether or not preparations for receiving charging are complete. The determination as to whether or not the preparations for receiving charging are complete may be made by determining whether or not the ignition switch is in a predetermined position (an OFF position, for example), the vehicle is stationary, and so on.

When YES is obtained in the determination of S210, coefficients $α_2$, $β_2$ and a set allowable input current value $I_{lim2}$ (0) for rapid charging are read from the second map 108, whereupon an allowable input current value $I_{lim2}$ (t) for rapid charging is calculated and the calculated allowable input current value $I_{lim2}$ (t) for rapid charging is set as the upper limit value of the charging current. This upper limit value is then set as an upper limit current of the current regulator 104.

Next, the charging current IB at the present time is compared with a predetermined charging upper limit value (S214). When the charging current is no larger than the predetermined value (i.e., the charging current is equal to or smaller than the predetermined value), the routine returns to S212, where charging is continued after setting the upper limit value of the current regulator 104 at the allowable input current value for rapid charging.

When the determination of S214 indicates that the charging current is larger than the predetermined value, on the other hand, coefficients $α_1$, $β_1$ and a set allowable input current value $I_{lim1}$ (0) for travel are read from the first map 106, whereupon an allowable input current value $I_{lim1}$ (t) for travel is calculated and the calculated allowable input current value $I_{lim1}$ (t) for travel is set as the upper limit value of the charging current (S216). As shown in FIG. 6, the coefficients $α_2$, $β_2$ and the set allowable input current value $I_{lim2}$ (0) for rapid charging are set on the assumption that the charging current is no larger than the predetermined value, and when the charging current exceeds the predetermined value, the coefficients $α_1$, $β_1$ and the set allowable input current value $I_{lim1}$ (0) for travel are employed instead. When rapid charging is not underway in S210, the routine advances to S216.

Hence, in this embodiment, limitations on the charging current are relaxed more during rapid charging than during travel. In so doing, the charging time required to charge the battery when the vehicle is stationary can be shortened, and as a result, the SOC can be restored sufficiently by performing charging for a comparatively short time at a charging station or the like.

Further, in this embodiment, the allowable input current value calculation unit 42 determines allowable input current values over time $I_{lim}'$ [T] and $I_{lim}'$ [t] taking into account a reduction in the performance of the secondary battery through use, or in other words temporal deterioration of the secondary battery, in order to suppress Li metal deposition over time. The allowable input current values over time $I_{lim}'$ [T] and $I_{lim}'$ [t] are determined by multiplying a deterioration coefficient η by the allowable input current values $I_{lim}$ (T) and $I_{lim}$ (t) obtained in the above equations.

$$I_{lim}'(T)=I_{lim}(T)×η$$

$$I_{lim}'(t)=I_{lim}(t)×η \quad (6)$$

The deterioration coefficient η may take a fixed value or a plurality of values. When the deterioration coefficient η takes a plurality of values, the deterioration coefficient η may be determined using a map defining a relationship between the deterioration coefficient and a charging/discharging frequency of the secondary battery, which is stored in advance in the RAM 36 of the EVECU 30.

Taking deterioration of the battery into consideration, the allowable input current value over time $I_{lim}'$ (t) is preferably used instead of the allowable input current value $I_{lim}$ (t) during both travel and rapid charging.

Furthermore, the input power limit value calculation unit 44 according to this embodiment calculates the battery input limit value $W_{in}$ (t) to prevent the battery current IB from flowing in excess of the allowable input current value over time $I_{lim}'$ (t) due to a control delay during feedback control or the like. More specifically, first, an input current limit target value $I_{tag}$ is calculated on the basis of the battery current value IB (t) at the time t and the allowable input current value over time $I_{lim}'$ (t) calculated in the allowable input current value calculation unit 42 (see FIG. 5). The input current limit target value $I_{tag}$ is calculated so as to be offset from the allowable input current value $I_{lim}$ (t) by a predetermined amount, for example. The battery input limit value $W_{in}$ (t) is then calculated on the basis of the obtained input current limit target value $I_{tag}$ in accordance with Equation (7).

Figure 5:
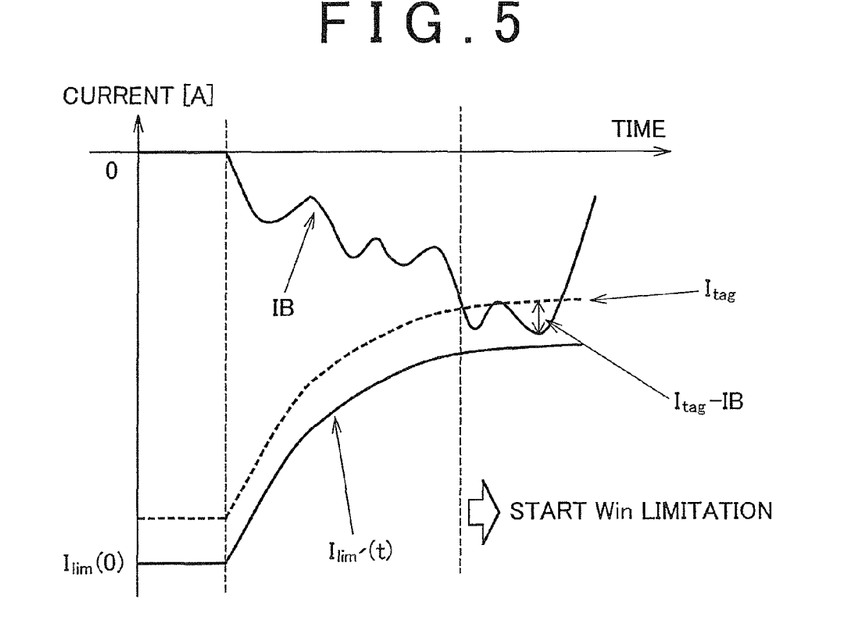
FIG. 5 is a view illustrating a configuration of an Equation (4) for determining an input power limit value.

As shown in FIG. 5, the input power limit value calculation unit 44 can suppress Li metal deposition in the negative electrode by controlling charging using the input power limit value $W_{in}$ (t) determined in Equation (7) such that the charging current IB remains at or below the allowable input current value over time $I_{lim}'$ (t).

$$W_{in}(t)=SW_{in}(t)-K_p×(IB(t)-I_{tag1}(t))-K_i×∫(IB(t)-I_{tag2}(t))dt \quad (7)$$

In Equation (7), $W_{in}$ (t) denotes the battery input power limit value at the time t, $SW_{in}$ (t) denotes a preset battery input power limit defining value (a base input power limit defining value of the battery, determined from the battery temperature, for example), $K_p$ denotes a p term feedback gain, $K_i$ denotes an i term feedback gain, $I_{tag1}$ (t) denotes a current limit target value obtained through p term feedback control, $I_{tag2}$ (t) denotes a current limit target value obtained through i term feedback control, and IB (t) denotes the battery current value at the time t. The battery input power limit defining value $SW_{in}$ (t) is determined from a preset map defining a relationship between the input power limit defining value and the battery temperature and so on, for example.

The current limit target values $I_{tag1}$ (t) and $I_{tag2}$ (t) are determined from Equation (8).

$$I_{tag1}(t)=F_p(I_{lim}'(t))$$

$$I_{tag2}(t)=F_i(I_{lim}'(t)) \quad (8)$$

In Equation (8), the current limit target values $I_{tag1}$ (t) and $I_{tag2}$ (t) are determined at values respectively offset from the allowable input current value over time $I_{lim}'$ (t) by predetermined amounts, as described above. Hence, a relationship between the current limit target values $I_{tag1}$, $I_{tag2}$ and the allowable input current value over time $I_{lim}'$ (t) is preferably stored in advance in the RAM 36 of the EVECU 30 in the form of a map such that the current limit target values $I_{tag1}$, $I_{tag2}$ can be determined by referring to the map. Note that when the map is created taking into account deterioration of the secondary battery and control of the secondary battery, Li metal deposition due to a local reduction in the negative electrode potential can also be suppressed.

The charging/discharging control apparatus 20 for a battery according to this embodiment may further include an upper limit voltage control unit that suppresses a reduction in the battery performance due to use by controlling an upper limit voltage of the lithium ion secondary battery so as not to exceed a preset upper limit voltage. For example, the upper limit voltage control unit controls a charging amount by comparing, in the EVECU 30, a preset upper limit voltage value with an actual battery voltage value output from the voltage sensor 16. By setting an upper limit value on the charging voltage in this manner, a situation in which an excessively large voltage is applied to a cell can be avoided.

What is claimed is:

1. A charging control apparatus for a battery, comprising a controller that:
   controls charging of an in-vehicle lithium ion secondary battery that is charged by power based on regenerative braking performed during vehicle travel and charged by power from an external power supply;
   determines whether external charging, in which the battery is charged by the power from the external power supply, or the vehicle travel is underway; and
   when the external charging is determined to be underway, increases an upper limit value of a charging current relative to that of a case in which the vehicle travel is determined to be underway,
   wherein the controller:
   calculates an allowable input current value $I_{lim}$ (t) per unit processing time dt using a following equation $$I_{lim}(t) = I_{lim}(t-1) - \alpha \times IB(t) \times dt - \beta \times \frac{I_{Ilim}(0) - I_{lim}(t-1)}{I_{lim}(0)} \times dt,$$

where $I_{lim}$ (0) is an initial allowable input current value used during initial charging, $I_{lim}$ (t−1) is a previously calculated allowable input current value calculated in a previous unit time, and $\alpha$, $\beta$ are coefficients; and
   set the initial allowable input current value and the coefficients $\alpha$, $\beta$ so that the initial allowable input current value and the coefficients $\alpha$, $\beta$ in a case in which the vehicle travel is determined to be underway are different from the initial allowable input current value and the coefficients $\alpha$, $\beta$ in a case in which the external charging is determined to be underway.

2. The charging control apparatus according to claim 1, further comprising:
   a battery current detection unit that detects a battery current; and
   a battery temperature detection unit that detects a battery temperature,
   wherein the controller:
   estimates a state of charge of the battery;
   when the external charging is determined to be underway, calculates an allowable input current value at a larger value than that of a case in which the vehicle travel is determined to be underway, on the basis of the battery current, the battery temperature, and the estimated state of charge; and
   determines the upper limit value of the charging current on the basis of the allowable input current value.

3. The charging control apparatus according to claim 2, further comprising a first map and a second map used to calculate the allowable input current value,
   wherein the controller switches between the first map and the second map according to whether the vehicle travel is determined to be underway or the external charging is determined to be underway.

4. The charging control apparatus according to claim 1, wherein the controller determines whether or not the charging current is no greater than a predetermined value, and
   when the charging current is determined to be no greater than the predetermined value while the external charging is underway, the controller increases the upper limit value of the charging current relative to that of a case in which the vehicle travel is determined to be underway.

5. A charging control method for a battery, which is executed by a controller, the method comprising:
   controlling, by the controller, charging of an in-vehicle lithium ion secondary battery that is charged by power based on regenerative braking performed during vehicle travel and charged by power from an external power supply;
   determining, by the controller, whether external charging, in which the battery is charged by the power from the external power supply, or the vehicle travel is underway; and
   increasing, by the controller, an upper limit value of a charging current relative to that of a case in which the vehicle travel is determined to be underway when the external charging is determined to be underway,
   calculating, by the controller, an allowable input current value $I_{lim}$ (t) per unit processing time dt using a following equation $$I_{lim}(t) = I_{lim}(t-1) - \alpha \times IB(t) \times dt - \beta \times \frac{I_{Ilim}(0) - I_{lim}(t-1)}{I_{lim}(0)} \times dt,$$

where $I_{lim}$ (0) is an initial allowable input current value used during initial charging, $I_{lim}$ (t−1) is a previously calculated allowable input current value calculated in a previous unit time, and $\alpha$, $\beta$ are coefficients; and
   setting, by the controller, the initial allowable input current value and the coefficients $\alpha$, $\beta$ so that the initial allowable input current value and the coefficients $\alpha$, $\beta$ in a case in which the vehicle travel is determined to be underway are different from the initial allowable input current value and the coefficients $\alpha$, $\beta$ in a case in which the external charging is determined to be underway.

* * * * *